INVENTORS
STOKELY WEBSTER
CLARE E. BARKALOW
BY
Robert S. Dunham,
ATTORNEY

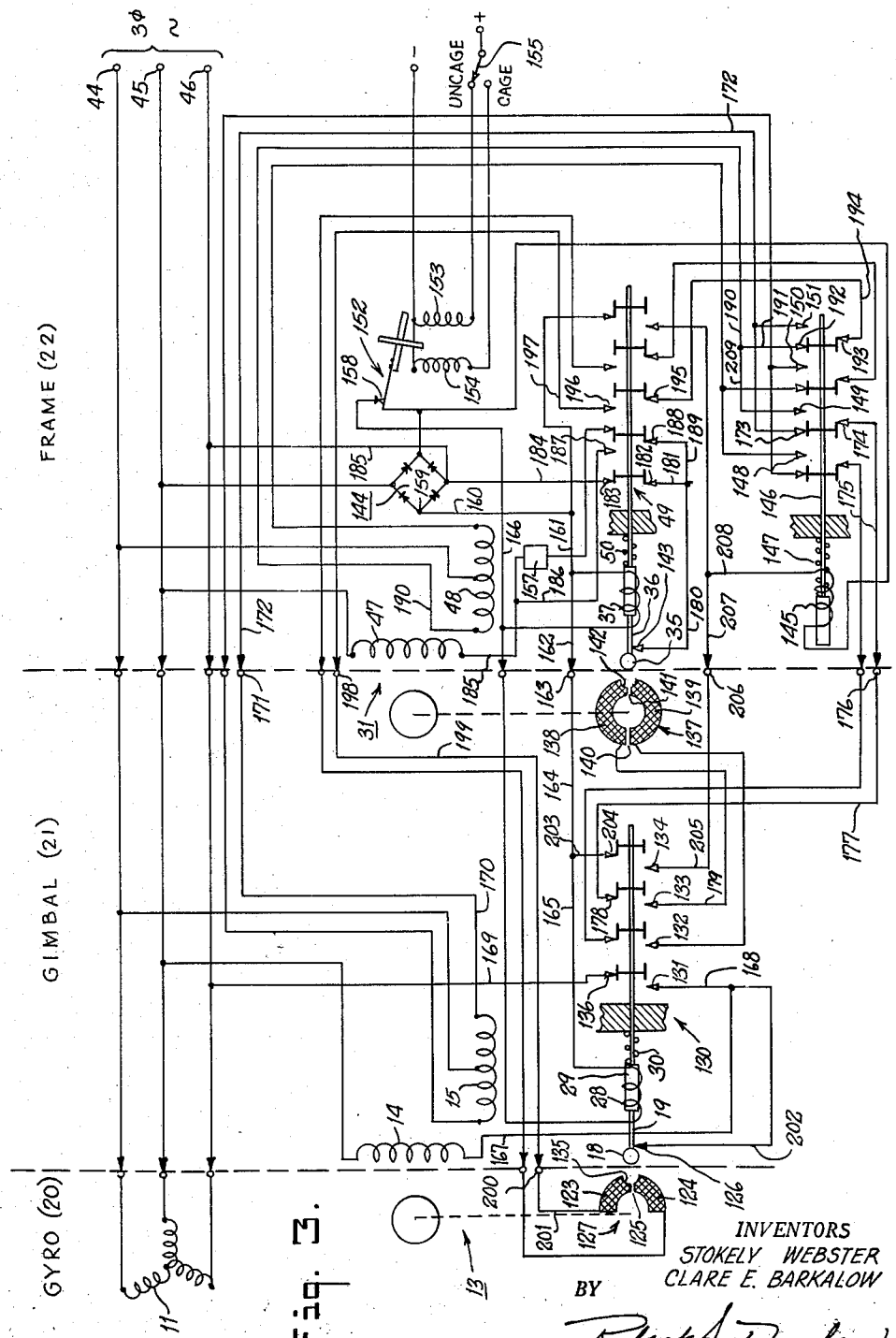

United States Patent Office 2,919,584
Patented Jan. 5, 1960

2,919,584

ELECTRIC METHOD OF AND SYSTEM FOR CAGING GYROSCOPES

Stokely Webster and Clare E. Barkalow, Huntington, N.Y., assignors, by mesne assignments, to United Aircraft Corporation, East Hartford, Conn., a corporation of Delaware Application June 10, 1955, Serial No. 514,456

10 Claims. (Cl. 74—5.1)

This invention is concerned with a gyro caging system. More specifically, the system according to this invention employs electric caging, i.e. makes use of electromagnetic torque motors to apply caging torque directly at the axes of suspension of the gyro. The invention is particularly adapted to caging gyros having two degrees of gimbal freedom.

Many gyroscopes which have two degrees of gimbal freedom are constructed with torque motors, or so-called torquers, for use in connection with servo-type controls that are associated with the gyroscope. By making use of this invention a gyroscope that is so equipped with torquers may be arranged to employ electric caging that is extremely rapid and reliable while being very simple mechanically, and which makes use of the already incorporated torque motors.

Consequently it is an object of this invention to teach a method of electrically caging gyroscopes.

Another object of this invention is to provide an electrical system for rapidly caging gyroscopes.

A further object of the invention is to provide a system employing electromagnetic torquers in connection with the axis of freedom of the gyroscope and in addition, simple yet very reliable mechanical detents for electromagnetically caging a gyroscope in a minimum of time, and with a maximum of reliability.

Still another object of this invention is to provide an electromagnetic caging system that is simple mechanically and in addition is reliable in providing positive and secure caging. At the same time, the system is rapid so that high levels of power may be applied to the electromagnetic torque motors for rapid caging, without overheating and damaging the motors.

Briefly, the invention concerns an electric caging system for a gyroscope wherein the gyroscope has a rotatable gyro mass supported by an inner gimbal. In addition, the gyroscope has an outer gimbal pivotally supporting said inner gimbal for rotation thereof about an axis of rotation at right angles to the axis of rotation of said gyro mass. Furthermore, the gyroscope has a frame pivotally supporting said outer gimbal for rotation thereof about an axis at right angles to the axis of rotation of said inner gimbal. The system comprises first electromagnetic means for applying torque to said outer gimbal about its pivotal axis, and second electromagnetic means for applying torque to said inner gimbal about its pivotal axis. In addition, the system comprises switching means for controlling energization of said electromagnetic means, detent means for caging said gimbals, and means associated with said gimbals and with said detent means for determining the action of said switching means, to provide reliable caging of the gyroscope in a minimum of time.

Certain embodiments of the system according to this invention are set forth in detail below and illustrated in the drawings, in which:

Fig. 3 is an electrical schematic illustrating another embodiment of the invention.

It will be understood that this invention may be carried out by employing many different structural embodiments and a full understanding of the invention may be had by reference to the electrical schematics illustrating different embodiments thereof. There has been illustrated a particular structure in connection with a gyroscope having two degrees of freedom; but this is merely an illustration of one particular style or construction of such a gyroscope, and is employed merely to aid in the explanation of the manner in which a system according to this invention operates.

Figure 1:
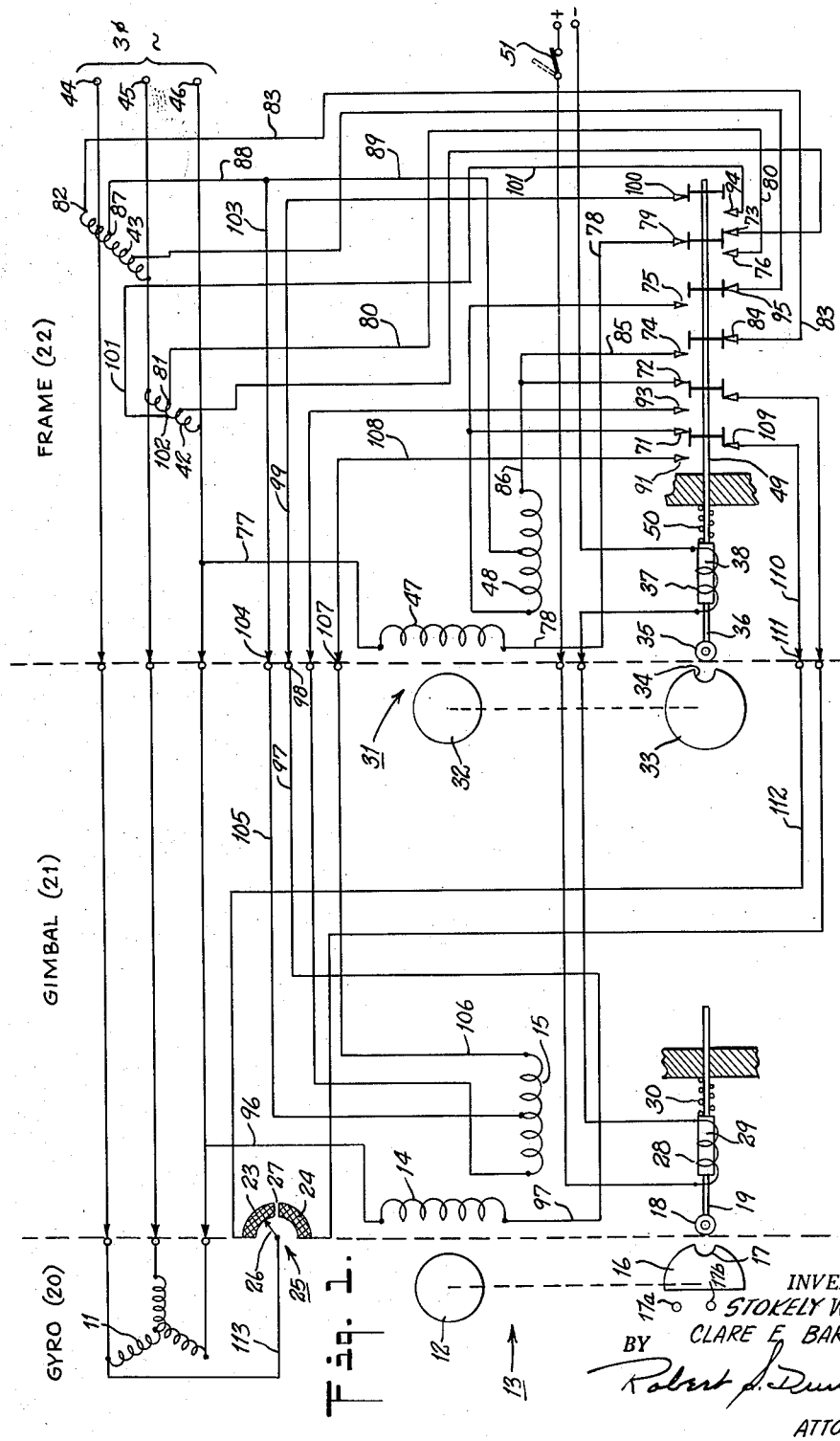
Fig. 1 is an electrical schematic illustrating one embodiment of the invention.

Fig. 1 illustrates a preferred embodiment of the invention and illustrates the elements of a gyroscope having two degrees of gimbal freedom which are employed in connection with the caging system of this invention. The system may be divided into three parts that are suspended from one another for relative rotation in the usual manner, e.g. by employing gimbals. The three elements include the gyro portion 20 which carries an electric motor 11, that may be any feasible type of electric motor for rotating the gyro mass. In this instance there is employed a three-phase A.C. motor that is supplied by a usual source of power in aircraft, which is a 400 cycle, three-phase A.C. supply. Also carried on the gyro element there is a rotor 12 of an electromagnetic torque motor 13, which may take various forms but which is here illustrated as being an A.C. induction motor having a main energization winding 14 and a center-tapped dephased winding 15 for reversibly energizing the motor by reaction with the main energizing winding 14. It will be noted that the windings 14 and 15 of the motor 13 are located on a gimbal selection 21 of the gyroscope.

Another element that is located on the innermost gyro section 20 of the system is a semi-circular cam disc 16 which has a recess 17 on the surface thereof for receiving a follower or roller 18 that is carried by a detent shaft 19, so that when the follower 18 falls into the recess 17, there is a positive locking or detent action to cage the inner gyro element 20 relatively to its gimbal support 21. It will be noted that the cam disc 16 is only semi-circular in the outline. This is because the inner gyro section 20 is constructed for a limited rotation, that is in the order of 180°. It will be be appreciated that the structure of the gyro is such that the inner gyro element 20 which supports the gyro mass for rotation thereon will have limiting stops 17a and 17b to limit the rotation thereof beyond about 90° either way from the central or caged position.

The second element 21 of the gyroscope has been given a caption "gimbal" in Fig. 1 and includes two sectors 23 and 24 of a sector switch 25. The sector switch 25 also includes a wiper arm 26 which is located on the above-mentioned gyro element 20 of the gyroscope, so that when the gyro element is in its neutral or caged position relative to the gimbal element, wiper arm 26 will be contacting an insulating strip or spacing band 27 that is located between the switch sectors 23 and 24. Also located on the gimbal section 21 are the windings 14 and 15 of the torque motor 13 (as was pointed out above) and the detent shaft 19 which includes elements for electromagnetically controlling the release of the detent shaft into its effective position. These elements includes a solenoid 28 and an armature 29 cooperating therewith. There is also a spring 30 that is under compression and acts to bias the detent shaft 19 to the left as viewed in Fig. 1. This spring bias is overcome by the action of solenoid 28 and its armature 29 when the solenoid is energized, so as to hold the detent shaft 19 to its retracted or ineffective position, e.g. that illustrated in Fig. 1.

Other elements located on the gimbal section 21 include an induction motor 31 which has a rotor 32 located on the gimbal section 21. The rotor 32 is directly connected to a circular cam disc 33, since both are carried by the gimbal section 21 for rotation therewith. The cam disc 33 has a recess 34 for receiving a follower or roller 35 of another detent shaft 36, that also includes a solenoid 37 and an armature 38. The detent shaft 36 and related elements, just described, are all situated on a frame section 22 and only come into effective operation upon the deenergization of the solenoid 37. Such deenergization allows the follower 35 of the detent 36 to contact the surface of the generally circular cam 33 which is located on the gimbal section 21 of the gyroscope and rotates always in positive conformity therewith.

It will be observed that the electrical connections are completed from one section of the gyroscope to the other by means of slip rings, which are illustrated as circles and arrows located at the dividing lines which separate the three sections as illustrated.

The frame section 22 of the gyroscope includes a majority of the electrical circuitry, and in connection therewith there is a pair of autotransformers that have windings 42 and 43. These are connected across two different phases of the three-phase supply wires, as illustrated. It will be noted that the three-phase A.C. supply is introduced at three terminals 44, 45 and 46 to which the electric power supply will be connected in any convenient manner, as by means of a plug-connector (see element 66—Fig. 2) or the like. The frame section 22 also carries a main field, or energizing winding 47 of the torque motor 31, and a dephased center-tapped winding 48 for reversibly energizing the motor 31.

There are certain additional elements for the system which include a multiple contact switch 49 that is directly connected to the detent shaft 36 for movement therewith by reason of a spring 50 which is under compression, and consequently tends to move the detent shaft 36 and multiple contact switch 49 to the left when viewed as illustrated in Fig. 1. It will be noted that the multiple contact switch 49 has three positions. One of these three is that illustrated, while another is that determined by the contacting of follower 35 onto the circular surface of the cam disc 33, anywhere except at the recess 34. Then a third position will be taken up by the switch 49 when the follower 35 falls into the recess 34, to lock the gimbal and frame in the caged position. There is a switch 51 that is illustrated in its closed position. This switch determines the energization of solenoids 28 and 37 so as to thus determine the caging action of the system. In other words, when switch 51 is open the system is in its caging mode of operation, and detent shafts 19 and 36 will be released for taking up their effective positions such that the followers 18 and 35 are held against the surface of the cam discs 16 and 33 respectively, as the caging mode of operation becomes effective. Thus, when the switch 51 is closed as illustrated in Fig. 1, the system is in its uncaged mode of operation, and the detent shafts 19 and 36 are withdrawn clear of the cams 16 and 33; and the torque motors 13 and 31 are deenergized in so far as any caging operation is concerned.

Figure 2:
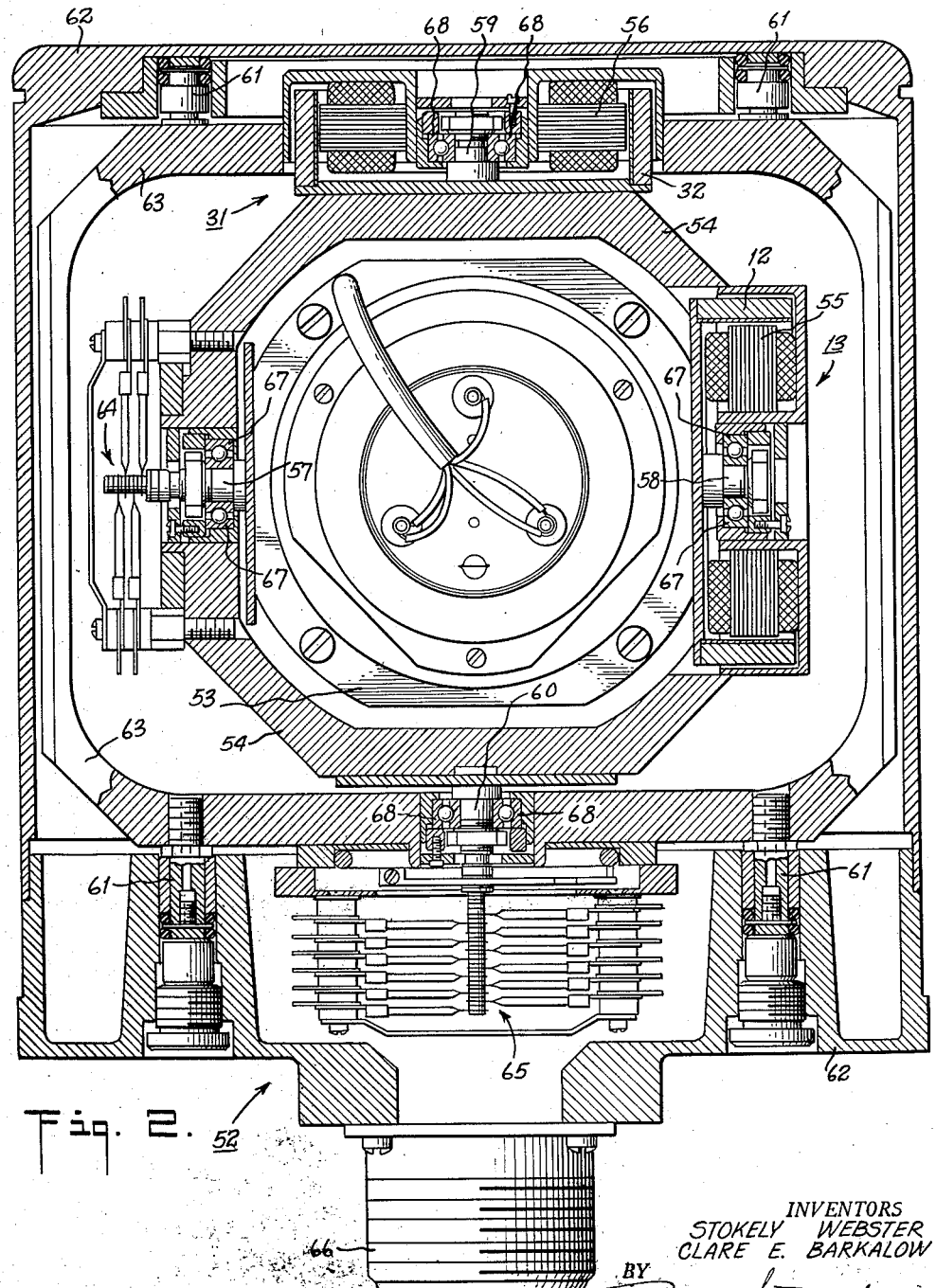
Fig. 2 is a plan view, partly in cross-section, illustrating a gyroscope having two degrees of gimbal freedom and including electromagnetic torque motors for the two axes of freedom thereof.

Referring to Fig. 2, it will be observed that there is here illustrated a typical gyroscope 52 having two degrees of gimbal freedom. There is an inner gimbal 53 that corresponds to the gyro section 20 of the Fig. 1 schematic, an outer gimbal 54 that corresponds to the gimbal section 21 of the Fig. 1 schematic, and a frame 63 that corresponds to the frame section 22 of the Fig. 1 schematic.

Among other elements of the system illustrated in Fig. 1 there are the torque motors 13 and 31, which have rotors 12 and 32 respectively, that are in the form of cylinders surrounding cores 55 and 56, which support the windings for each motor, as illustrated.

The three sections of the gyroscope may be more readily visualized by referring to Fig. 2, where the inner gimbal 53 (or gyro section 20) is, in actual structure, a casing that supports the gyro mass for rotation about an axis that is at right angles to the paper, when the gyroscope is in the position illustrated. In addition, the center of gravity of the gyro mass plus the gimbal 53 which supports it, is located in the plane of the paper as well as being located centrally of the structure, as illustrated in Fig. 2. In this manner the effects of vibrations and shock loads on the gyroscope are most readily absorbed without causing disturbing torques to be applied to the rotating and other parts. The outer gimbal 54 (corresponding to gimbal section 21) is shown partly in cross-section. This gimbal carries the stator, i.e. windings and core 55 of the motor 13. Also supported on, or carried by, the gimbal 54 are sets of bearings 67 for a pair of shafts 57 and 58 that are in alignment with one another and that rotatably support the inner gimbal 53, i.e. gyro section 20, for rotation about an axis that is at right angles to the gyro mass rotation axis (perpendicular to the plane of the paper) described above.

The frame 63 (corresponding to frame section 22) similarly carries the stator of the torque motor 31. This stator, in like manner, includes the windings (47 and 48—Fig. 1) that are situated on the core 56. In addition, frame 63 carries bearings 68 for supporting a pair of shafts 59 and 60 that are integrally attached to the outer gimbal 54 and that are in alignment with one another. The axis of shafts 59 and 60 lies at right angles to the gyro mass rotation axis in the position shown, and in addition lies at right angles to the axis of rotation of the inner gimbal 53, i.e. the axis of the aligned supporting shafts 57 and 58 thereof.

It will be noted that the frame 63 is supported in a vibration-free manner by four studs 61 which extend from the frame 63 into recesses in an outer casing 62 of the entire unit. The details of this vibration-absorption mounting in connection with the studs 61, form no part of this invention but are fully described and claimed in a copending application Serial No. 513,202, filed June 6, 1955, by Clarence E. Barkalow for Vibration-Resistant Mounting and assigned to the same assignee as this invention. It is pointed out that there are slip rings 64 and 65 for completing electrical circuits between the relatively rotatable elements. The entire gyroscope unit also includes a threaded extension 66 which carries plug-in connectors for introducing the electrical power and control circuits to the unit.

*Operation of Fig. 1 embodiment*

In order to understand the operation of the caging system as disclosed in Fig. 1, an operative example will be set forth. The principles involved in the operation of this caging system are briefly as follows:

A high power level of energization is applied to the "outer" torque motor 31 upon the commencement of a caging operation, as determined by the switch 51. The torque thus produced causes a precession of the gyro section 20 (inner gimbal 53) about its axis until this element of the gyroscope either strikes one of its stops 17a and 17b or is arrested by the detent 19, as its follower 18 falls into the recess 17. When either of these arresting actions takes place, the torque (as applied by the torque motor 31 to the outer gimbal 54) will now cause rotation of the gimbal section 21 itself (outer gimbal 54) until the detent 36 arrests the rotation by reason of its follower 35 falling into the recess 34 of the cam 33. This action of the follower roller 35 then deenergizes the torque motor 31 (by the switching action of switch 49) and, in case the gyro section 20 (inner gimbal 53) was against a stop rather than in its caged position, the torque motor 13 will then be energized in the proper direction (as determined by the sector switch 25) so as to rotate the gyro section 20 (inner gimbal 53) about its axis of rotation until the follower 18 arrests the gyro in its caged position. When both followers 18 and 35 have fallen into position the caging operation is completed.

It will be noted that the caging as thus effectuated is extremely rapid in addition to being very reliable. The reliability stems from the simplicity of the structure which may be employed in connection with the detent mechanisms. In this connection it will be appreciated that the mechanisms illustrated in Fig. 1 are merely schematic and the actual structure for these arrangements may take various forms. For example it will be understood that the recesses 17 and 34 are in fact relatively deep V-shaped recesses so that the followers 18 and 35 of the detent mechanisms, will be lodged well below the outer contour of the cams 16 and 33 in each case. This will insure a locking action that will arrest the elements securely in the caged position.

The rapidity of caging is enhanced by reason of this invention, and one of the factors involved in the short time required in caging is that a high level of energization may be employed in connection with the torque motor 31 during its caging mode of operation. This may be done because the invention provides means for automatically switching from this mode of high energization as soon as detenting of the outer axis is accomplished and thus will avoid any overheating or burning of the windings of this motor. In this connection it will be noted that the autotransformer 43 is connected to supply a relatively high voltage to one side or the other of the center-tapped winding 48 of motor 31 to provide the desired high energization and high torque.

A detailed example of the operation of Fig. 1, as a caging sequence is carried out, is as follows: Switch 51 will be opened, thus deenergizing solenoids 28 and 37, and allowing springs 30 and 50 to cause detent shafts 19 and 36 to move to the left, as viewed in Fig. 1, until their respective followers 18 and 35 contact the circular contours of cam discs 16 and 33. At this time the switch 49 will be shifted to a position where the circuits, including a set of contacts 71, 72 and 73 will be broken, while the circuits including another set of contacts 74, 75 and 76 will be closed. It is pointed out that the switch 49 is one where the movable contacts thereof are carried by an insulating support to electrically isolate each one, while each contact completes a conductive path vertically in the obvious manner. Of course the showing of the switch in Figs. 1 and 3 is schematic and the structure of the actual switch used may take various forms.

Under the conditions just described, the torque motor 13 remains deenergized while the torque motor 31 becomes energized for rotation in a given direction in the following manner: The winding 47 is connected to one phase of the supply at one end thereof via a wire 77 and the main phase line wire which leads from terminal 46. The other side of the winding 47 is connected via a wire 78 to a switch contact 79, and then via one of the movable contacts of switch 49 to the switch contact 76, which is now connected as indicated above, and via a wire 80 to a tap 81 on the autotransformer 42. At the same time, one-half of the winding 48 is energized over the following circuit: Beginning at a tap 82 of the autotransformer 43 and going via a wire 83 to a contact 84, and continuing via one of the movable contacts of switch 49 to the now closed contact 74 thereof, and via a wire 85 and a wire 86 to one end of the winding 48. The center tap of the winding 48 is maintained permanently connected to a tap 87 of the autotransformer 43, via a circuit including wires 88 and 89.

Thus the motor 31 is energized for rotation in a given direction and applies torque about the axis of rotation of gimbal section 21 (gimbal 54), so that the gyro section 20 (inner gimbal 53) will be caused to precess about its axis of rotation until a stop is encountered, or until the follower 18 engages to arrest the rotation in caged position. Following either of these two actions the gimbal section 21 (outer gimbal 54) is then free to rotate without restraint from the gyroscopic inertia, and it will rapidly turn about its axis of rotation under the torque applied by the motor 31, until follower 35 stops its rotation in the caged position.

When follower 35 thus engages to cage the gimbal section 21, the switch 49 takes up its third position. Then the following circuit conditions are effectuated: Circuits for a set of contacts 91, 93 and 94 will be completed while circuits for contacts 79, 84 and 95 are broken. The motor 31 is now deenergized since the circuit including contact 79 is broken, which opens the circuit connecting one side of winding 47 to the tap 81 on autotransformer 42.

At this point, if the gyro section 20 (gimbal 53) has been resting against a stop rather than being caged by action of the follower 18, a circuit will be had for energizing the torque motor 13 in the proper direction for rotating gyro section 20 (inner gimbal 53) rapidly about its axis of rotation, to the caged position therefor.

The circuit for this action may be traced as follows: Winding 14 of the motor 13 will be energized over a circuit beginning with a wire 96 that is connected to the main three-phase supply as introduced at the terminal 46. The other side of winding 14 is connected via a wire 97 and a slip ring 98, to another wire 99 that leads to a stationary contact 100 of the switch 49. At this time the movable contacts of switch 49 have moved to the third position thereof so that the contact 94 is closed and the circuit being traced may be continued via contact 94 and a wire 101 to a tap 102 on the autotransformer 42.

At the same time, the proper half of the center-tapped winding 15 of motor 13 will be energized to cause rotation in the desired direction. The circuit for thus energizing one half of the winding 15 may be traced as follows: A wire 103 is connected to a point between wires 88 and 89, and so connected directly to the tap 87 of autotransformer 43. Then going back from this source of power the circuit goes via a slip ring 104 and a wire 105 to the center tap of the winding 15. Then the right-hand end of the winding 15 (as viewed in Fig. 1) is connected via a wire 106 and a slip ring 107, to a wire 108 that leads to the contact 91. This is now closed with the movable contact of switch 49 and so the circuit may be continued via a stationary contact 109 and a wire 110 to a slip ring 111. Then, continuing via a wire 112 to the sector 23 of the sector switch 25, and from there over the wiper arm 26 to a wire 113, which is directly connected to the phase of the three-phase supply that is introduced at the terminal 44. Consequently the motor 13 will cause rotation of the gyro section 20 (inner gimbal 53) in the proper direction until follower 18 engages and locks this gyro section in its caged position. In this caged position, wiper arm 26 will be centrally located contacting insulation strip 27, and thus the motor 13 will be deenergized when the gyroscope is caged.

Of course if the gyro section 20 (gimbal 53) has been resting against the other stop, the wiper arm 26 will have been contacting the sector 24 and the torque motor 13 will be energized for rotation in the opposite direction until the caged position is reached from the other side thereof.

*Figure 3 embodiment*

In Fig. 3, another embodiment of the invention is illustrated. In this instance the system is basically the same, but there are a few additional elements employed. The same reference numbers are employed for the parts which remain unchanged over those employed in the system according to Fig. 1. It will be observed that there are the same three sections, i.e. gyro section 20, gimbal section 21 and frame 22 which are relatively rotatable one within the other. The three-phase gyro motor 11 is the same as before and the torque motor 13 remains the same.

One of the elements that is different is involved in the arrangement in connection with the detent mechanism 19, the semi-circular cam portion of this detent arrangement is made up of a pair of conducting sectors 123 and 124 which are separated by an insulating gap 125. These conducting sectors thus form a sector switch 127 in conjunction with the follower roller 18 of the detent 19. The detent mechanism 19 is carried by the gimbal section 21 and has in addition an electrical wiper contact 126 for making a circuit that will be completed via the roller 18 to one or the other of the conducting sectors 123 and 124.

In connection with the detent 19 as it is employed in this system, there is a multiple contact switch 130 that is held in the right-hand one (as viewed in Fig. 3) of three positions, by the action of solenoid 28 in connection with armature 29 when the solenoid is energized. The other two positions of the switch 130 are determined by the movements of detent 19 to the left, under the bias of the compression spring 30. The follower and detent arrangement sets up one position when the roller 18 is in contact with the circular contour of either sector 123 or 124. In this position the contacts of the switch 130 will be positioned as follows: Lower stationary contacts 131, 132 and 133 will be closed by the movable contacts of the switch 130, while a lower contact 134 will remain open. The second of these two positions of the switch 130 occurs when the roller 18 falls into a recess 135 that is formed on the outer surfaces of sectors 123 and 124, to provide a locking action the same as that had with detent 19 as used in the system according to Fig. 1. When the switch 130 takes up this left handmost position, the contact 134 will be closed by the corresponding movable contact, while a stationary contact 136 will be opened.

Another element of this Fig. 3 system which is different from that according to Fig. 1 is a sector switch 137 that takes place of the cam disc 33 in Fig. 1, and that is constructed of two semi-circular sectors 138 and 139. These sectors are made of conducting material and are separated electrically by gaps 140 and 141. The sector switch 137 has a recess 142 which acts to receive the roller 35 of the detent 36, in the same manner as the comparable recess 34 did in the system according to Fig. 1. There is a sliding contact 143 associated with the detent 36 for making the necessary electrical circuits via the roller 35 and sectors 138 and 139.

On the frame section 22, among the additional or changed elements, there is a rectifier network 144 that is connected at its input corners across one phase of the three-phase source, i.e. from the circuit which is directly connected to the terminal 45 to the circuit which is directly connected to the terminal 46. Thus this rectifier 144 supplies a full wave rectified direct current source at the output (horizontal corners, as viewed in Fig. 3) thereof.

The output of this rectifier network 144 is connected to supply D.C. for energizing the solenoid windings 28 and 37, as well as a solenoid winding 145 of a solenoid operated circuit breaker switch 146, that has a compressed spring 147 to bias the movable contacts thereof to the left, as viewed in Fig. 3, so that the switch takes up the position illustrated when the solenoid 145 is deenergized. Energization of the solenoid 145 will shift the movable contacts of the switch 146 so as to close a set of stationary contacts 148, 149, 150 and 151 on the switch 146.

To control the circuits for setting up a caging, or uncaging operation, there is a solenoid-operated switch 152 that has a pair of coils 153 and 154 which are alternatively energized by means of a cage or uncage switch 155.

It will be noted that the multiple contact switch 49 in the system according to Fig. 3 has a somewhat different arrangement of the stationary and movable contacts from those employed in Fig. 1, since different circuit operations are performed by the switch in the Fig. 3 system. In addition, it is pointed out that in the system illustrated in Fig. 3 there is shown an impedance 157 which is illustrated as a square box and which represents a control impedance that may be employed with the gyroscope when operated normally, i.e. when the gyroscope is uncaged and running.

*Operation of Fig. 3 embodiment*

In general, the operation of a system according to the embodiment illustrated in Fig. 3 may be briefly set forth as follows: When the caging switch 155 is moved to the caged position, the energizing circuit for solenoids 28 and 37 is broken, and the detents 19 and 36 will be released into their effective positions (contacting one of the sectors of the sector switches 127 and 137, which correspond to the cams 16 and 33 of the Fig. 1 system). This will create energizing circuits for the torque motors 13 and 31, in such a direction for each as to create a tendency for the gyro to precess about each of the two axes of freedom, toward the neutral or caged position in each case. Then when either one or the other of the detents 19 or 36 becomes effective, by reason of falling into its recess of either the roller 18 or 35 respectively, the action will be changed by reason of the switching action caused when the switch 130 or 49 takes up its third or left handmost position, as viewed in Fig. 3. This switching will cause the other torque motor 13 or 31, from that connected to the detent and cam associated with the axis which was caged, to be energized in the proper direction for now rotating its elements without the restraining gyroscopic inertia until the caging position is reached, about this axis also.

The details of the operation of this system may be made clear by tracing the operations in connection with a particular example as follows: Assuming that the gyro section 20 is rotated so that sector 123 of its sector switch 127 lies under the contact roller 18 of detent 19. Assuming further that the sector 138 of the sector switch 137 lies under the contact roller 35 of the detent 36. Then beginning with the shifting of the cage switch 155 to the lower position, as viewed in Fig. 3, it will be observed that the winding 154 of the switch 152 will be energized and contacts 158 of the switch 152 will be opened. This will deenergize the solenoids 37 and 28, which are connected in parallel to the output of the rectifier 144 via the following circuit: From a point 159 via a wire 160 and a wire 161 to one side of the solenoid 37, as well as via a wire 162 and a slip ring 163 to a wire 164 and a wire 165 that is connected to one side of the solenoid 28. The other sides of these two solenoids 37 and 28 are connected in common via the circuits plainly illustrated which may be traced after the combining thereof, via a wire 166 to the isolated one of the now open contacts 158 of the switch 152.

Now the detents 19 and 36 will be in their effective positions ready to secure each axis in caged position, and the torque motor 13 will be energized over the following circuits: The winding 14 is connected at one end thereof to the main line connected to three-phase terminal 45. The other side of the winding 14 may be traced to its energizing connection via a wire 167 and a wire 168 to the contact 131 (now connected to the movable contact of switch 130) and then via the contact 136 and a wire 169 to the main three-phase power line which connects to the terminal 46.

At the same time, one half of the winding 15 of torque motor 13 is energized as follows: The center tap is connected directly to the main supply line coming from three-phase supply terminal 44, and the right-hand end of the winding 15 is connected to another of the three-phase supply lines over the following circuit: Beginning with a wire 170 and going via a slip ring 171 and another wire 172 to a stationary contact 173 of the switch 146. The switch 146 is now in the illustrated position, so that the circuit may be continued over one of the movable contacts of the switch 146 and via a stationary contact 174 and another wire 175 to a slip ring 176, then via another wire 177 to a stationary contact 178 of the switch 130. This circuit then continues via one of the movable contacts of switch 130 and the stationary contact 133 thereof, to a wire 179 that is connected to the sector 138 of the sector switch 137. Then the circuit continues via the roller 35 of the detent 36 and the sliding contactor 143 to a wire 180 and a wire 181 that leads to a stationary contact 182. The circuit then continues via a movable contact to a corresponding stationary contact 183, and then via a wire 184 and another wire 185 to the main line connecting the three-phase supply via terminal 46.

In like manner, the torque motor 31 will be energized in a direction for causing precession about the axis supporting the gyro section 20 toward the caged position of that section (inner gimbal 53) via the following circuits: The main energization winding 47 is connected with one side thereof directly attached to the line leading from terminal 45, and the other side thereof being connected via wires 185 and 186 to a stationary contact 187 that is now connected to the corresponding movable contact and thence to a stationary contact 188. The circuit then continues via a wire 189 and the wire 181, back to the stationary contact 182 and then across to the stationary contact 183, the wire 184 and on via the wire 185 to the main line connected to terminal 46. One half of the winding 48 of the motor 31 will be energized as determined by which of the sectors 123 or 124 of the sector switch 127 are in the circuit. Assuming as we have in the present example that the sector 123 is in contact with the roller 18, a circuit will be had for the left hand portion of winding 48 which may be traced as follows: The center-tapped connection of the winding 48 is permanently connected to the line coming from terminal 44 as clearly illustrated. The left-hand end of the winding is connected in a manner which may be traced beginning with a wire 190 and continuing via wire 191 to a stationary contact 192 of the switch 146. Then the circuit continues via the stationary contact 193 and a wire 194 to a stationary contact 195 and then across the movable contact which is now positioned to carry the circuit to an upper stationary contact 196, from whence the circuit continues via a wire 197, a slip ring 198, a wire 199, another slip ring 200 and a wire 201 to the sector 123. From here the circuit may be continued via the roller 18 and sliding contactor 126 to a wire 202 and then via the wire 168 and the stationary contact 131 to the movable contact of switch 130 which is now connected thereto. Then the circuit continues via the stationary contact 136 and the wire 169 to the line directly connected to terminal 46.

Now, assuming that the detent 19 is first to fall into its caging position. The switch 130 will take up its third position and the contacts 136 and 134 thereof will be opened and closed respectively. Consequently the switch 146 will be energized and shifted to its other position so that the contacts 148, 149, 150 and 151 will be closed and complete circuits to their corresponding contacts of the switch 146. These combined actions will deenergize the motor 13 and energize the motor 31 in the proper direction for rotating the gimbal section 21 (outer gimbal 54) directly toward its caged position. Deenergizing of the motor 13 takes place when the stationary contact 136 is opened, while energizing of the solenoid 145 (to actuate the switch 146) is accomplished by a D.C. circuit which may be traced as follows: Beginning at the output point 159 of the rectifier 144, and going over the wire 160 and wires 161, 162 to the slip ring 163 and on via the wire 164 to a wire 203, that is connected to a stationary contact 204. The circuit then continues via a movable contact of switch 130 to the stationary contact 134 which has been closed by the movement of the switch 130 into its final or left-handmost position. The circuit continues via a wire 205 and a slip ring 206, a wire 207 and another wire 208 to one side of the solenoid 145. The other side of the solenoid 145 is directly connected to the other output of the rectifier 144 as clearly illustrated.

The actuation of the switch 146 provides a circuit for energizing the motor 31 in the proper direction (as controlled by the sector switch 137) so as to rotate the gimbal section 21, relative to the frame section 22, in the direction toward the caged position. In this instance the same half of the winding 48 of motor 31 will again be energized but the circuit for determining this energization will be carried via the sectors of sector switch 137 which, in the assumed example, must be sector 138. Thus, while the center-tapped connection for winding 48 is directly connected to the power supply as mentioned above, the left-hand end thereof is now connected via a circuit which may be traced over wires 190 and 209 to the stationary contact 149. Then this circuit may be continued over the movable contact of the switch 146 to contact 174 and on via the wire 175, slip ring 176, wire 177, contact 178, movable contact of switch 130, contact 133, wire 179, to the sector 138. Then continuing, the circuit travels via roller 35, sliding contact 143, wire 180, wire 181, contact 182, movable contact to contact 183, wire 184 and wire 185 to the main line connecting terminal 46.

It will be appreciated that the systems of both Fig. 1 and Fig. 3 may each be employed; in connection with a gyroscope such as the gyroscope unit illustrated in Fig. 2. In each case the physical structure for the various elements of the caging systems is not material to the invention since the elements employed may take many different forms. Consequently no attempt has been made in Fig. 2 to illustrate the structure of such elements as detents and their related cams and recess slots, etc.

It will also be appreciated that although a three phase system for energizing the various elements has been illustrated, the invention is equally applicable to a single phase type, or even to a D.C. system if desired.

While certain embodiments of the invention have been described in considerable detail in accordance with the applicable statutes, these are not to be taken in any way as limiting the scope of this invention but merely as being descriptive of particular embodiments thereof.

It is claimed:

1. An electric caging system for a gyroscope having a rotatable gyro mass supported by an inner gimbal, an outer gimbal pivotally supporting said inner gimbal for rotation thereof about an axis at right angles to the axis of rotation of said gyro mass, and a frame pivotally supporting said outer gimbal for rotation thereof about an axis at right angles to the axis of rotation of said inner gimbal comprising a first electric motor having a rotor and a stator, said rotor being attached to one of said inner and outer gimbals and said stator being attached to the other, a second electric motor having a rotor and a stator, said second motor rotor being attached to one of said outer gimbal and said frame and said second motor stator being attached to the other, means for supplying electric energy to actuate said motors, switching means for controlling the energization of said motors, detent means for caging said gimbals, and means associated with said gimbals and with said detent means for determining the action of said switching means to provide reliable caging of the gyroscope in a minimum of time.

2. An electric caging system for a gyroscope having a rotatable gyro mass supported by an inner gimbal, an outer gimbal pivotally supporting said inner gimbal for rotation thereof about an axis at right angles to the axis of rotation of said gyro mass, and a frame pivotally supporting said outer gimbal for rotation thereof about an axis at right angles to the axis of rotation of said inner gimbal comprising a first electric motor having a rotor and a stator, said rotor being attached to one of said inner and outer gimbals and said stator being attached to the other, a second electric motor having a rotor and a stator, said second motor rotor being attached to one of said outer gimbal and said frame and said second motor stator being attached to the other, means for supplying electric energy to actuate said motors, switching means for controlling the energization of said motors, and a detent for each gimbal including a cam surface and a follower biased into contact therewith, at least part of said switching means being actuated by one of said cam followers whereby the switching action is regulated in connection with the caging as it is effectuated.

3. An electric caging system for a gyroscope having a rotatable gyro mass supported by an inner gimbal, an outer gimbal pivotally supporting said inner gimbal for rotation thereof about an axis at right angles to the axis of rotation of said gyro mass, and a frame pivotally supporting said outer gimbal for rotation thereof about an axis at right angles to the axis of rotation of said inner gimbal comprising a first electric motor having a rotor and a stator, said rotor being attached to one of said inner and outer gimbals and said stator being attached to the other, a second electric motor having a rotor and a stator, said second motor rotor being attached to one of said outer gimbal and said frame and said second motor stator being attached to the other, means for supplying electric energy to actuate said motors, a detent for each gimbal including a cam surface and a follower biased into contact therewith, a three-position switch having a plurality of separate contacts thereon, said switch being connected for actuation by one of said cam followers, electromagnetic means for holding said followers against the bias out of contact with the cam surfaces, and circuit means interconnecting said motors with said three-position switch to cause said second motor to be energized when the switch is in one position and to cause the first motor to be energized under certain conditions when the switch is in another position in order to cause a rapid caging of the gyroscope.

4. An electric caging system for a gyroscope having a rotatable gyro mass supported by an inner gimbal, an outer gimbal pivotally supporting said inner gimbal for rotation thereof about an axis at right angles to the axis of rotation of said gyro mass, and a frame pivotally supporting said outer gimbal for rotation thereof about an axis at right angles to the axis of rotation of said inner gimbal comprising a first electric motor having a rotor and a stator, said rotor being attached to one of said inner and outer gimbals and said stator being attached to the other, a second electric motor having a rotor and a stator, said second motor rotor being attached to one of said outer gimbal and said frame and said second motor stator being attached to the other, means for supplying electric energy to actuate said motors, a detent for each gimbal including a cam surface and a follower biased into contact with said surface, electromagnetic means for holding said followers against the bias out of contact with the cam surfaces, a three-position switch having a plurality of separate contacts thereon, said switch being connected for actuation by one of said cam followers, a sector switch operable by relative motion between said inner gimbal and said outer gimbal, and circuit means interconnecting said motors said three-position switch and said sector switch for energizing said second motor until said detent for the outer gimbal has locked same in caged position and then for energizing said first motor until said detent for the inner gimbal has locked same to complete the caging of the gyroscope.

5. An electric caging system for a gyroscope having a rotatable gyro mass supported by an inner gimbal, an outer gimbal pivotally supporting said inner gimbal for rotation thereof about an axis at right angles to the axis of rotation of said gyro mass, and a frame pivotally supporting said outer gimbal for rotation thereof about an axis at right angles to the axis of rotation of said inner gimbal comprising a first electric motor having a rotor and a stator, said rotor being attached to one of said inner and outer gimbals and said stator being attached to the other, a second electric motor having a rotor and a stator, said second motor rotor being attached to one of said outer gimbal and said frame and said second motor stator being attached to the other, means for supplying electric energy to actuate said motors, a detent for each gimbal including a cam surface and a follower biased into contact therewith, a three-position switch associated with each cam follower having electromagnetic means for holding the follower out of contact with its cam surface in each case, each said cam surface having a recess in a substantially circular contour in order to determine two positions of said three-position switches, one when the follower is on said circular contour and one when the follower is in said recess, an electromagnetically actuated switch, and circuit means for interconnecting said three-position switches and said electromagnetically actuated switch for energizing said motors in a cross axis manner until one of said detents locks a gimbal in caged position and then for deenergizing the motor for the locked axis while energizing the other motor for rotating the other gimbal to its caged position.

6. An electric caging system for a gyroscope having a rotatable gyro mass supported by an inner gimbal, an outer gimbal pivotally supporting said inner gimbal for rotation thereof about an axis at right angles to the axis of rotation of said gyro mass, and a frame pivotally supporting said outer gimbal for rotation thereof about an axis at right angles to the axis of rotation of said inner gimbal comprising a first electric motor having a rotor and a stator, said rotor being attached to one of said inner and outer gimbals and said stator being attached to the other, a second electric motor having a rotor and a stator, said second motor rotor being attached to one of said outer gimbal and said frame and said second motor stator being attached to the other, means for supplying electric energy to actuate said motors, a detent for said inner gimbal having a cam surface on said inner gimbal and a follower carried by said outer gimbal biased into engagement with said cam surface and having a recess in said cam surface for receiving said follower to lock said inner gimbal in its caged position against rotation relative to said outer gimbal, electromagnetic means for overcoming the bias on said follower to uncage the gyroscope, sector switch means for selectively closing one of two circuits depending upon which side of the caged position said inner gimbal is located relative to said outer gimbal, a detent for said outer gimbal having a cam surface on said outer gimbal and a follower carried by said frame biased into engagement with said outer detent cam surface and having a recess in said outer detent cam surface for receiving said frame carried follower to lock said outer gimbal in its caged position against rotation relative to said frame, electromagnetic means for overcoming the bias on said frame carried follower to uncage the gyroscope, multiple contact switch means actuated by said frame carried follower for energizing said second motor until said outer gimbal detent has locked the outer gimbal in caged position, and circuit means for connecting said sector switch means to said multiple contact switch and to said electric energy supply means for energizing said first motor until said inner gimbal detent has locked the inner gimbal to complete the caging of the gyroscope.

7. A caging system for a gyroscope having a pair of gimbals mounted for pivotal movement about respective mutually perpendicular axes and adapted to be moved to caged positions including in combination first means for applying a precessing torque about the axis of a first one of said gimbals to cause a rotation of the second of said gimbals about its axis, second means for applying a precessing torque about the axis of said second gimbal to cause a rotation of the first gimbal about its axis, means for simultaneously energizing said first and second torque applying means, respective means for locking said gimbals in said caged positions, and means responsive to the operation of the locking means associated with one of said gimbals for de-energizing the corresponding torque-applying means.

8. A caging system for a gyroscope having a pair of gimbals mounted for pivotal movement about respective mutually perpendicular axes including in combination an electric torque motor adapted to be energized to apply a precessing torque about the axis of a first one of said gimbals to cause a rotation of the second of said gimbals about its axis, means for energizing said torque motor, means for locking said second gimbal in a predetermined position to which it moves under the action of said precessing torque, respective stops associated with said second gimbal, an electric torque motor adapted to be energized to apply a torque about the axis of said second gimbal and means responsive to the engagement of said second gimbal with one of said stops to energize said second gimbal to permit said locking means to operate.

9. A caging system for a gyroscope having a pair of gimbals mounted for pivotal movement about respective mutually perpendicular axes including in combination an electric torque motor adapted to be energized to apply a precessing torque about the axis of a first one of said gimbals to cause a rotation of the second of said gimbals about its axis, means for energizing said torque motor, means for locking said second gimbal in a predetermined position to which it moves under the action of said precessing torque, respective stops associated with said second gimbal, and adapted to be engaged thereby to arrest the movement of said second gimbal, means for locking said first gimbal in a predetermined position to which it moves under the influence of said torque motor when the movement of said second gimbal is arrested, a second electric torque motor and means responsive to operation of said first gimbal-locking means for energizing said second torque motor to move said second gimbal to permit said second gimbal locking means to operate.

10. A caging system for a gyroscope having a pair of gimbals mounted for pivotal movement about respective mutually perpendicular axes including in combination first means for applying a precessing torque about the axis of a first one of said gimbals to cause a rotation of the second of said gimbals about its axis, second means for applying a precessing torque about the axis of the second one of said gimbals to cause a rotation of the first of said gimbals about its axis, respective means for locking said gimbals in predetermined positions and means responsive to the operation of the locking means associated with one of said gimbals to vary the torque applied by the means for applying the torque about the axis of the other gimbal.

References Cited in the file of this patent

UNITED STATES PATENTS

| | | |
|---|---|---|
| 1,996,896 | Bennett | Apr. 9, 1935 |
| 2,369,845 | Noxon | Feb. 20, 1945 |
| 2,591,741 | Stone | Apr. 8, 1952 |
| 2,674,891 | Konet et al. | Apr. 13, 1954 |
| 2,685,206 | Fillebrown | Aug. 3, 1954 |
| 2,722,124 | Smith | Nov. 1, 1955 |
| 2,729,978 | Judson | Jan. 10, 1956 |
| 2,732,719 | Watson | Jan. 31, 1956 |